United States Patent
Edirisooriya et al.

(10) Patent No.: US 7,406,553 B2
(45) Date of Patent: Jul. 29, 2008

(54) SYSTEM AND APPARATUS FOR EARLY FIXED LATENCY SUBTRACTIVE DECODING

(75) Inventors: Samantha J. Edirisooriya, Tempe, AZ (US); Sujat Jamil, Chandler, AZ (US); David E. Miner, Chandler, AZ (US); R. Frank O'Bleness, Tempe, AZ (US); Steven J. Tu, Phoenix, AZ (US); Hang T. Nguyen, Tempe, AZ (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 11/734,401

(22) Filed: Apr. 12, 2007

(65) Prior Publication Data

US 2007/0186019 A1 Aug. 9, 2007

Related U.S. Application Data

(63) Continuation of application No. 10/262,360, filed on Sep. 30, 2002, now Pat. No. 7,219,176.

(51) Int. Cl.
*G06F 13/42* (2006.01)

(52) U.S. Cl. .................. 710/107; 710/306; 710/305

(58) Field of Classification Search ............... 710/107, 710/110, 306, 100, 240, 105, 315; 709/208; 714/18; 718/100, 104; 370/438, 349
See application file for complete search history.

(56) References Cited

U.S. PATENT DOCUMENTS

| 4,110,823 | A | * | 8/1978 | Cronshaw et al. | |
|---|---|---|---|---|---|
| 5,715,411 | A | * | 2/1998 | Verdun | |
| 5,748,918 | A | * | 5/1998 | Cho et al. | |
| 5,864,688 | A | * | 1/1999 | Santos et al. | |
| 5,892,931 | A | * | 4/1999 | Cohen et al. | |
| 5,935,226 | A | * | 8/1999 | Klein | 710/303 |
| 5,968,151 | A | * | 10/1999 | Williams | |
| 5,987,244 | A | * | 11/1999 | Kau et al. | 713/500 |
| 6,032,210 | A | * | 2/2000 | Downey | 710/105 |
| 6,076,128 | A | * | 6/2000 | Kamijo et al. | |
| 6,088,753 | A | * | 7/2000 | Sheafor et al. | |
| 6,112,273 | A | * | 8/2000 | Kau et al. | 710/260 |
| 6,421,754 | B1 | * | 7/2002 | Kau et al. | 710/261 |
| 7,219,176 | B2 | * | 5/2007 | Edirisooriya et al. | 710/107 |
| 2004/0064616 | A1 | * | 4/2004 | Edirisooriya et al. | 710/107 |
| 2005/0060468 | A1 | * | 3/2005 | Emerson et al. | 710/305 |
| 2007/0162672 | A1 | * | 7/2007 | Edirisooriya et al. | 710/117 |
| 2007/0186019 | A1 | * | 8/2007 | Edirisooriya et al. | 710/107 |

OTHER PUBLICATIONS

"Enhanced differentially coherent subtractive interferene cancellation receivers with multiple symbol differential detection" by Correl et al. (abstract only) Publication Date: Jun. 18-22, 2000.*

(Continued)

*Primary Examiner*—Clifford H Knoll (57) ABSTRACT

Systems and methods for early fixed latency subtractive decoding are disclosed. The subtractive decoding device speculatively acknowledges a bus transaction within a fixed time period that is the same as the time period for positive decoding. Pipelining of a new bus transaction may therefore be accomplished each new time period. A bus transaction may be retried if no acknowledgement occurs within the fixed time period.

20 Claims, 10 Drawing Sheets

OTHER PUBLICATIONS

Deal, W., "An Experimental Automatic Communication System for Air Traffic Control," (abstract only) publication date: Jun. 1959.*

Intel Corporation, 21050 PCI-to-PCI Bridge Configuration, Application Note, Order No. 278033-001, Table of Contents and p. 10, Aug. 1998.*

Intel Corporation, 21154 PCI-to-PCT Bridge Configuration, Application Note, Order No. 278080-001, Table of Contents and p. 10, Oct. 1998.*

Müller, Hans, "The Peripheral Component Interconnect: PCT local bus by Intel became the de facto local bus of computer industry and of future High Energy Physics Experiments," CERN/ECP-ED0 RD24 Project, Presentation at CERN ECP, Feb. 23, 1998.*

* cited by examiner

SYSTEM AND APPARATUS FOR EARLY FIXED LATENCY SUBTRACTIVE DECODING

RELATED APPLICATIONS

This application is a continuation of application Ser. No. 10/262,360 filed on Sep. 30, 2002, now U.S. Pat. No. 7,219,176, which is incorporated herein by reference.

FIELD OF THE DISCLOSURE

This disclosure relates generally to the field of interconnect architectures. In particular, the disclosure relates to subtractive decoding support for shared busses.

BACKGROUND OF THE DISCLOSURE

A device on a bus may acknowledge and claim a transaction if the transaction corresponds to an address within an assigned address range for that device. Such a device may be said to use active decoding or positive decoding when a check is made of the address with respect to the assigned address range.

In some cases, devices are not all of the same speed. Consequently, a bus protocol may provide for positive decoding of fast devices within a first predetermined time period and for positive decoding of slower devices within a second predetermined time period. One potential drawback of such a scheme is that a bus master must wait for the slower devices if no faster device acknowledges and claims the transaction within the first predetermined time period. Another potential drawback is that it may be desirable to dynamically add devices to the system, yet the added devices may vary in speed and the address ranges for these devices may not be known in advance.

A technique, which may simplify the bus protocol, is to permit one device to acknowledge and claim any transaction if the transaction corresponds to an address that is not acknowledged and claimed by another device. Such a device may be said to use subtractive decoding. For an example, a bridge may be used to connect a PCI (peripheral component interconnect) bus to an ISA (industry standard architecture) bus. On the PCI bus, a PCI device may acknowledge and claim a transaction, for instance, within one to three cycles. Then if no PCI device acknowledges the transaction, a subtractive decoding device may acknowledge and claim the transaction for a slower ISA device without knowing which ISA device may eventually acknowledge the transaction.

The potential drawback of such a technique is that it, too, adds an additional delay for the subtractive decoding beyond the predetermined time period in which all of the positive decoding devices must respond.

BRIEF DESCRIPTION OF THE DRAWINGS

The present invention is illustrated by way of example and not limitation in the figures of the accompanying drawings.

DETAILED DESCRIPTION

Disclosed herein is a process and apparatus for fixed latency subtractive decoding. A subtractive decoding device may speculatively acknowledge a bus transaction within a fixed time period. The same time period for acknowledgement of bus transactions applies for positive decoding and for subtractive decoding. Thus pipelining of a new bus transaction may be accomplished with each new bus cycle. If no acknowledgement occurs within the fixed time period the bus transaction may be retried.

It will be appreciated that the fixed time period for acknowledgement need not be the same as the bus cycle for pipelining transactions. For example, bus transactions may be acknowledged within three bus cycles from initiation of the transaction, while a new bus transaction may be initiated in each new cycle.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A data processing device or system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, network appliances or digital audio recorder/players.

A register is any device capable of storing and providing data. Further functionality of a register with respect to data formats is described below. A register is not necessarily, included on the same die or in the same package as the processor.

A wireless device or interface may be understood to mean any one of a variety of devices or interfaces for wireless communications. Examples include but are not limited to any combination of devices for one or more of the following: short-range radio, satellite communications, infrared communications, wireless local area networks, wireless telephony, cellular digital packet data, home radio frequency, narrowband time-division multiple access, code-division multiple access, wideband code-division multiple access, wireless fidelity or short message service.

A bus transaction may be understood to mean any one of a variety of types of transactions on various different kinds of busses including but not limited to data read transactions, data write transactions, control or status register read transactions, control or status register write transactions, memory/cache hierarchy management transactions, direct memory access transactions, arbitration transactions, security challenge transactions, locked transactions, messaging transactions, or broadcast transactions.

A device to participate in bus transactions may be understood to mean any one of a variety of analog or digital devices, finite state machines, or interfaces for initiating, transferring, receiving, buffering, storing or sending signals including but not limited to addresses, control signals, instructions, coherency signals, interrupt signals, synchronization signals, identification signals, passwords, configuration signals, keep alive signals, routing signals, or data.

It will be appreciated that the invention may be modified in arrangement and/or detail by those skilled in the art without departing from the principles of the present invention within the scope of the accompanying claims and their equivalents.

Figure 1:
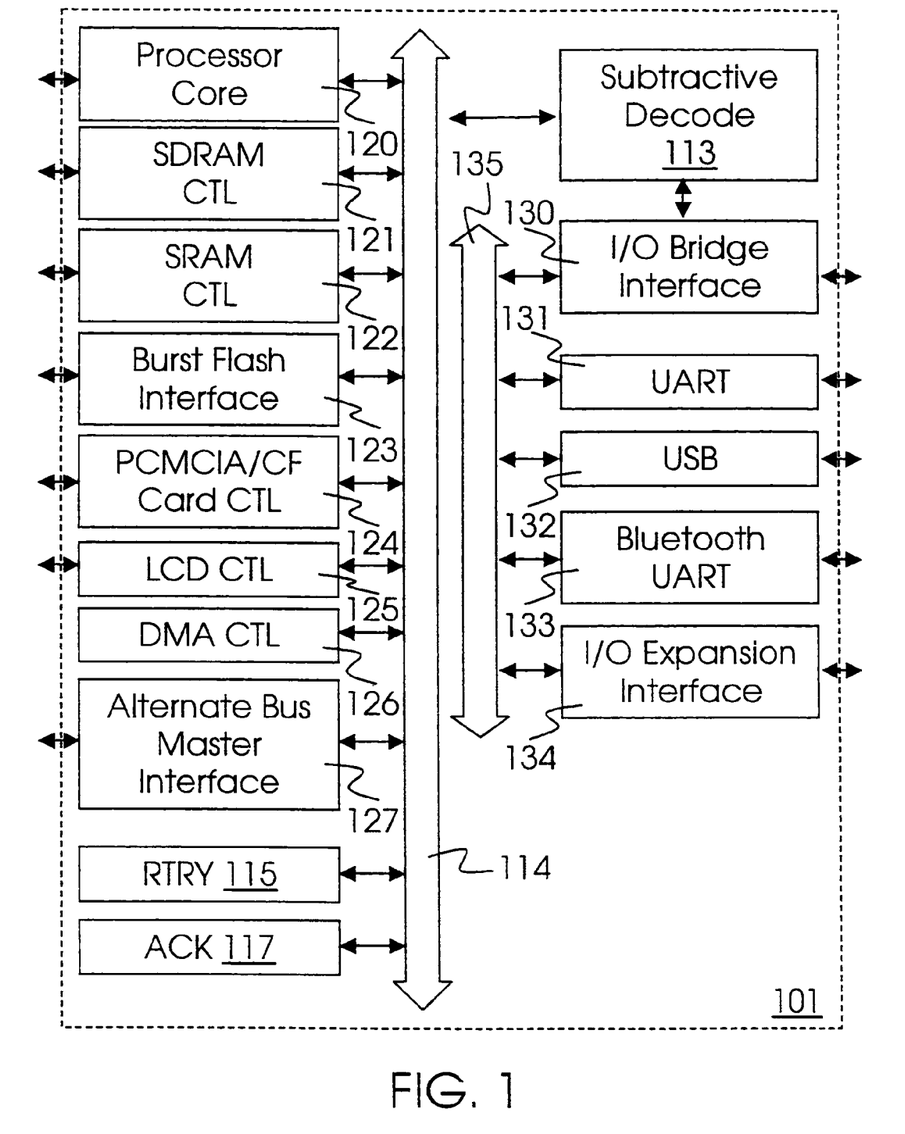
FIG. 1 illustrates one embodiment of a data processing system capable of performing fixed latency subtractive decoding.

Turning now to FIG. 1, one embodiment of a data processing system 101 capable of performing fixed latency subtractive decoding is illustrated. One embodiment of data processing system 101 is an Intel® Personal Internet Client Architecture (Intel® PCA) applications processors with Intel XScale™ technology (as described at http://developer.intel.com) but the invention is not so limited.

Data processing system 101 comprises a processing core 120, acknowledge logic 117, subtractive decoding device 113 capable of performing fixed latency subtractive decoding, and optionally comprises retry logic 115 to signal for a retry of a bus transaction when sufficient resources are not available to complete the transaction.

Processing core 120 is coupled with bus 114 for communicating with various other system devices, which may include but are not limited to, for example, synchronous dynamic random access memory (SDRAM) control 121, static random access memory (SRAM) control 122, burst flash memory interface 123, personal computer memory card international association (PCMCIA)/compact flash (CF) card control 124, liquid crystal display (LCD) control 125, direct memory access (DMA) controller 126, and alternative bus master interface 127.

One embodiment of data processing system 101 comprises subtractive decoding device 113 and I/O bridge interface 130 for communicating with various I/O devices via an I/O bus 135. Such I/O devices may include but are not limited to, for example, universal asynchronous receiver/transmitter (UART) 131, universal serial bus (USB) 132, Bluetooth wireless UART 133 and I/O expansion interface 134.

Figure 2:
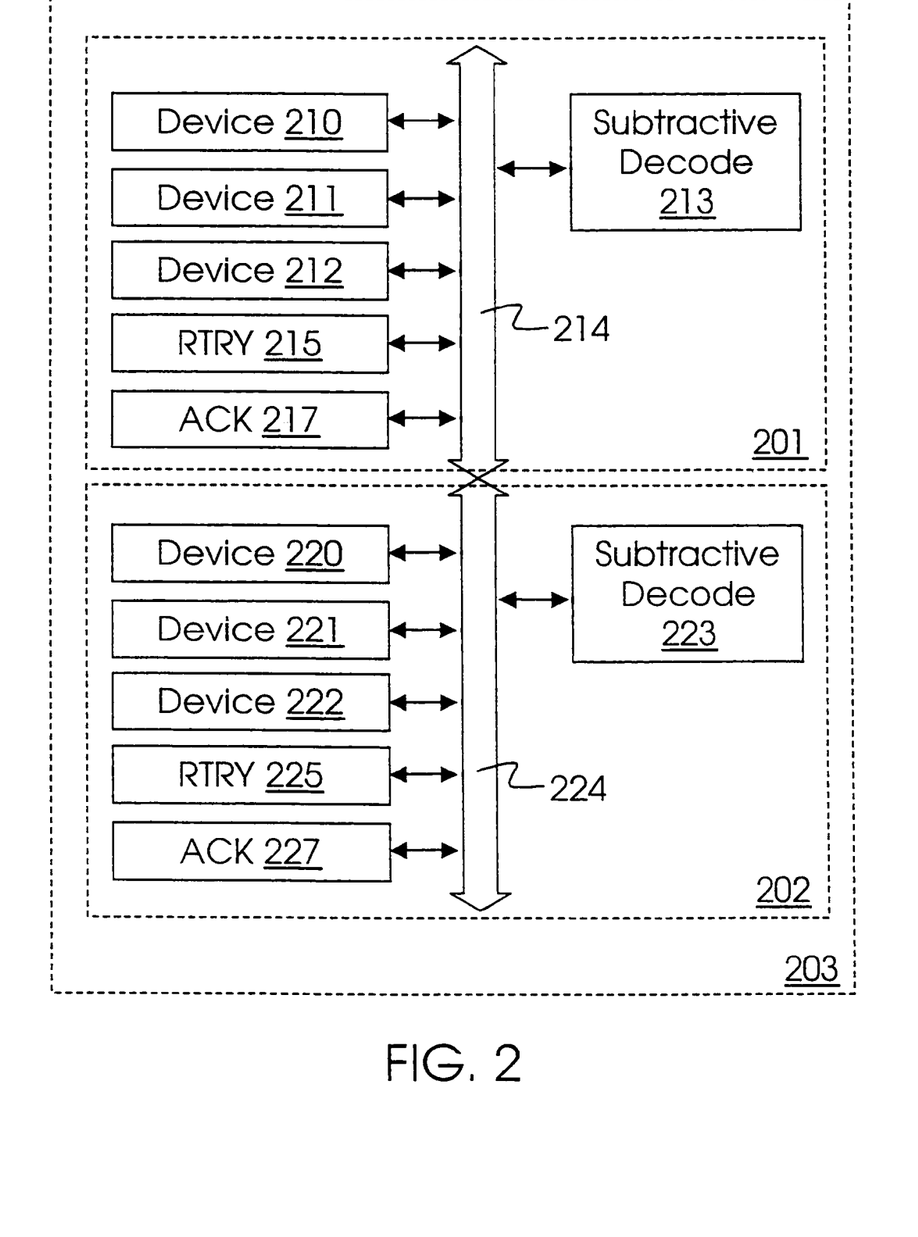
FIG. 2 illustrates an alternative embodiment of a data processing system capable of performing fixed latency subtractive decoding.

Turning next to FIG. 2, an alternative embodiment of a data processing system 203 capable of performing fixed latency subtractive decoding is illustrated. Data processing system 203 comprises a system 201 of devices for acknowledging bus transactions of a first address range within a first predetermined time period and a system 202 of devices for acknowledging bus transactions of a second address range within a second predetermined time period.

System 201 comprises devices 210-212, subtractive decoding device 213, acknowledge logic 217, and optionally retry logic 215. One embodiment of subtractive decoding device 213 speculatively acknowledges bus transactions of the first address range transmitting an acknowledge signal to acknowledge logic 217 within the first predetermined time period. Subtractive decoding device 213 disregards the bus transaction if it senses another acknowledgement or a retry signal from one of the devices 210-212. Devices 210-212 may acknowledge or signal to retry a bus transaction of the first address range if it also corresponds to an assigned address range for their particular device. Subtractive decoding device 213 may perform subtractive decoding with the same fixed latency as positive decoding of devices 210-212, for example, for a class of faster devices that are mapped to the first address range, thereby providing for dynamic addition or removal of a class of faster devices.

System 202 comprises devices 220-222, subtractive decoding device 223, acknowledge logic 227, and optionally retry logic 225. One embodiment of subtractive decoding device 223 speculatively acknowledges bus transactions of the second address range transmitting an acknowledge signal to acknowledge logic 227 within the second predetermined time period. Subtractive decoding device 223 disregards the bus transaction if it senses another acknowledgement or a retry signal from one of the devices 220-222 or from system 201. Devices 220-222 may acknowledge or signal to retry a bus transaction of the second address range if it also corresponds to an assigned address range for their particular device. Subtractive decoding device 223 may perform subtractive decoding with the same fixed latency as positive decoding of devices 220-222, for example, for a class of slower devices that are mapped to the second address range, thereby providing also for dynamic addition or removal of a class of slower devices.

Thus system 202 may provide for fixed latency subtractive decoding in each predetermined time period of a bus protocol having multiple predetermined time periods for devices of different speeds. For one embodiment, one or both of subtractive decoding devices 213 and 223 may also comprise range registers for positive decoding of the first or second address ranges respectively. For one alternative embodiment the first address range may be indicated as a memory space, therefore different from and opposed to the second address range being indicated as an I/O space, for example.

Figure 3:
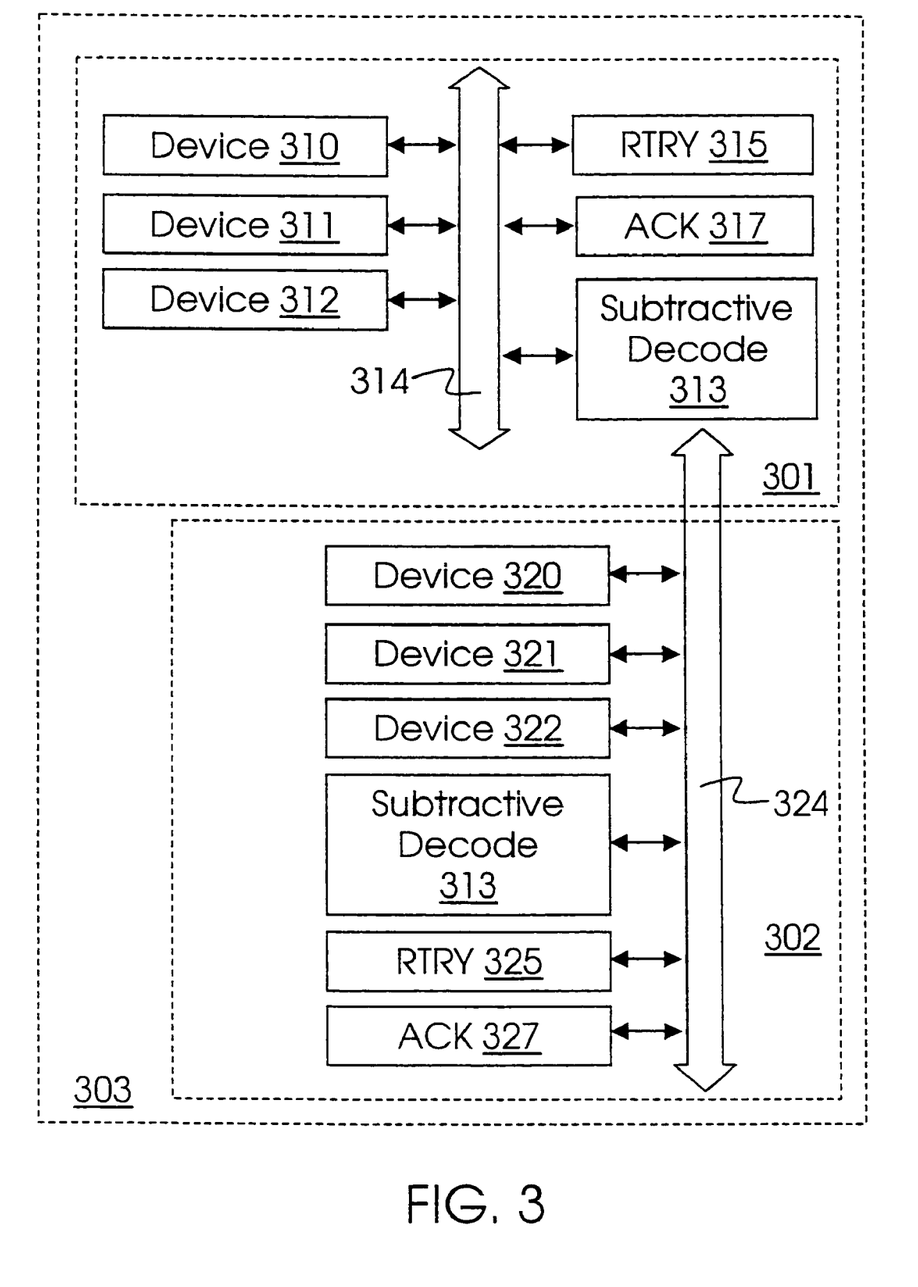
FIG. 3 illustrates another alternative embodiment of a data processing system capable of performing fixed latency subtractive decoding.

FIG. 3 illustrates another alternative embodiment of a data processing system 303 capable of performing fixed latency subtractive decoding. Data processing system 303 comprises a system 301 of devices for acknowledging bus transactions within a first predetermined time period and system 302 of devices for acknowledging bus transactions within a second predetermined time period.

System 301 comprises positive decoding devices 310-312, subtractive decoding device 313, acknowledge logic 317, and optionally comprises retry logic 315. One embodiment of subtractive decoding device 313 speculatively acknowledges bus 314 transactions transmitting an acknowledge signal to acknowledge logic 317 within the first predetermined time period. Subtractive decoding device 313 disregards the bus 314 transaction if it senses another acknowledgement or a retry signal from one of the devices 310-312. Devices 310-312 may acknowledge or signal to retry a bus 314 transaction if it corresponds to an assigned address range for their particular device. Subtractive decoding device 313 may perform subtractive decoding with the same fixed latency as the positive decoding of devices 310-312, thereby potentially providing for dynamic addition or removal of devices, simplification of the bus protocol and increased system performance. For one embodiment of system 301, fixed latency subtractive decoding further provides for efficient pipelining of transactions on bus 314.

System 302 comprises devices 320-322, subtractive decoding device 323, acknowledge logic 327, and optionally retry logic 325. One embodiment of subtractive decoding device 323 speculatively acknowledges bus 324 transactions, transmitting an acknowledge signal to acknowledge logic 327 within the second predetermined time period. Subtractive decoding device 323 disregards the bus 324 transaction if it senses another acknowledgement or a retry signal from one of devices 320-322. Devices 320-322 may acknowledge or signal to retry a bus 324 transaction if it corresponds to an assigned address range for their particular device. Subtractive decoding device 323 may perform subtractive decoding with the same fixed latency as positive decoding of devices 320-322, thereby providing for dynamic addition or removal of a class of slower devices, for example. For one embodiment, one or both of subtractive decoding devices 313 and 323 may also comprise bridge interfaces for two different types of busses.

Figure 4A:
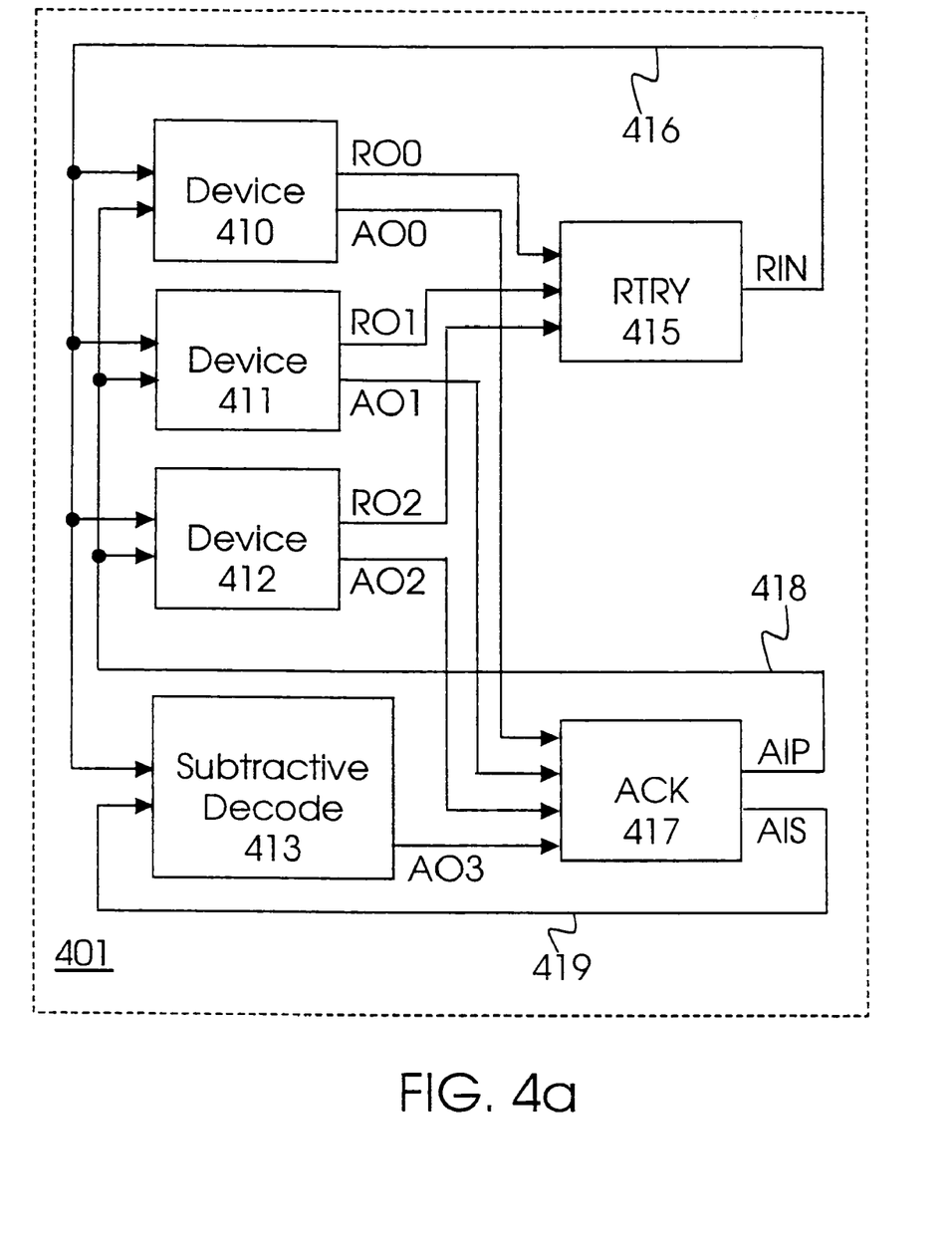
FIG. 4a illustrates details of one alternative embodiment of a data processing system capable of performing fixed latency subtractive decoding.

FIG. 4a illustrates details of one alternative embodiment of a data processing system 401 capable of performing fixed latency subtractive decoding. System 401 comprises devices 410-412, subtractive decoding device 413, acknowledge logic 417, and optionally comprises retry logic 415. One embodiment of subtractive decoding device 413 speculatively acknowledges bus transactions, transmitting an acknowledge signal AO3 to acknowledge logic 417 within a predetermined time period.

If the bus transaction corresponds to an assigned address range for device 410, device 410 may acknowledge, transmitting an acknowledge signal AO0 to acknowledge logic 417; or optionally signal to retry the bus transaction, transmitting a retry signal RO0 to retry logic 415 within the same predetermined time period. Similarly, devices 411 or 412 may acknowledge, via acknowledge signals AO1 or AO2, or retry the bus transaction, optionally via retry signals RO1 or RO2 within the predetermined time period.

Subtractive decoding device 413 disregards the bus transaction if it senses another acknowledgement through acknowledge signal AIS generated by acknowledge logic 417 or retry signal RIN generated by retry logic 415 for one of devices 410-412. Devices 410-412 may also sense acknowledgement or a signal to retry a bus transaction through acknowledge signal AIP generated by acknowledge logic 417 or through retry signal RIN generated by retry logic 415 respectively. When acknowledgement is signaled by subtractive decoding device 413 and also by one of devices 410-412, the one of devices 410-412 that acknowledged the bus transaction senses the expected acknowledge signal AIP. Optionally a bus transaction may be retried whenever one of devices 410-412 signals retry logic 415 to retry the bus transaction so that retry signal RIN is generated, or whenever no acknowledge signal AIP is generated by acknowledge logic 417. Interpretation of the acknowledge signal AIP and the retry signal RIN for one embodiment of a data processing system 401 is shown in Table 1.

TABLE 1

| AIP | RIN | Interpretation |
|---|---|---|
| 1 | 0 | Acknowledgement of the transaction |
| 1 | 1 | Signaling to retry (positive decode) |
| 0 | 1 | Signaling to retry (positive decode) |
| 0 | 0 | Signaling to retry (subtractive decode) |

Thus, subtractive decoding device 413 may perform subtractive decoding with the same fixed latency as positive decoding of devices 410-412.

Figure 4B:
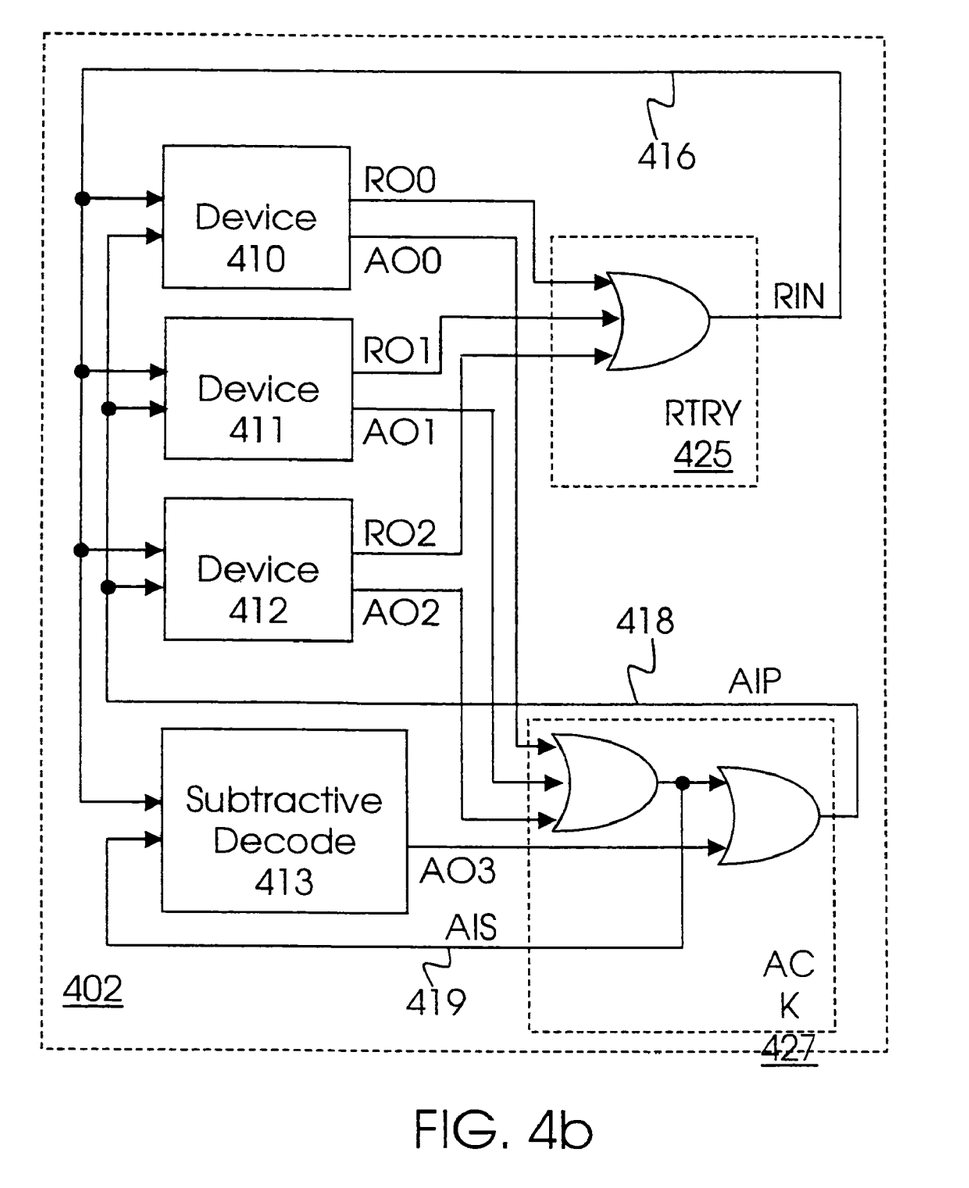
FIG. 4b illustrates details of another alternative embodiment of a data processing system capable of performing fixed latency subtractive decoding.

FIG. 4b illustrates details of another alternative embodiment of a data processing system 402, which comprises devices 410-412, subtractive decoding device 413, acknowledge logic 427, and optionally comprises retry logic 425. One embodiment of subtractive decoding device 413 speculatively acknowledges bus transactions, transmitting an acknowledge signal AO3 to acknowledge logic 427 within a predetermined time period.

For one embodiment of acknowledge logic 427, assertion of acknowledge signal AO3 causes the generation of an asserted acknowledge signal AIP, for example, through use of an OR gate. If the bus transaction corresponds to an assigned address range for device 410, device 410 may acknowledge, transmitting an acknowledge signal AO0 to acknowledge logic 417; within the same predetermined time period. Similarly, devices 411 or 412 may acknowledge, via acknowledge signals AO1 or AO2. Assertion of any one of acknowledge signals AO0-AO2 causes the generation of an asserted acknowledge signal AIS, for example, through use of another OR gate. Assertion of acknowledge signal AIS or assertion of acknowledge signal AO3 further causes the generation of an asserted acknowledge signal AIP.

For one embodiment of retry logic 425, devices 410, 411 or 412 may signal to retry the bus transaction, via retry signals RO0, RO1 or RO2. Assertion of any one of retry signals RO0, RO1 or RO2 causes the generation of an asserted retry signal RUN, for example, through use of an OR gate.

Subtractive decoding device 413 disregards the bus transaction if it senses another acknowledgement through acknowledge signal AIS generated by acknowledge logic 427 or retry signal RIN generated by retry logic 425. Devices 410-412 may also sense acknowledgement or a signal to retry a bus transaction through acknowledge signal AIP generated by acknowledge logic 427 or through retry signal RIN generated by retry logic 425 respectively. A bus transaction may be retried whenever one of devices 410-412 signals retry logic 425 to retry the bus transaction so that retry signal RIN is generated, or whenever no acknowledge signal AIP is generated by acknowledge logic 427. Thus, subtractive decoding device 413 may perform subtractive decoding with the same fixed latency as positive decoding of devices 410-412.

It will be appreciated that acknowledge logic and/or retry logic as illustrated above may be modified in arrangement and detail by those skilled in the art without departing from the principles disclosed. For example, NAND gates may be used instead of OR gates if the gate input signals are asserted low, or NOR gates may be used if gate output signals are asserted low. Further, the completion or retrying of bus transactions may be performed in accordance with the above disclosure through the interpretive functioning of positive and subtractive decoding devices and bus mastering devices or through interaction with explicit acknowledge and/or retry logic or through a combination of both, thereby permitting for tradeoffs to be made according to the convenience of the designer.

Figure 4C:
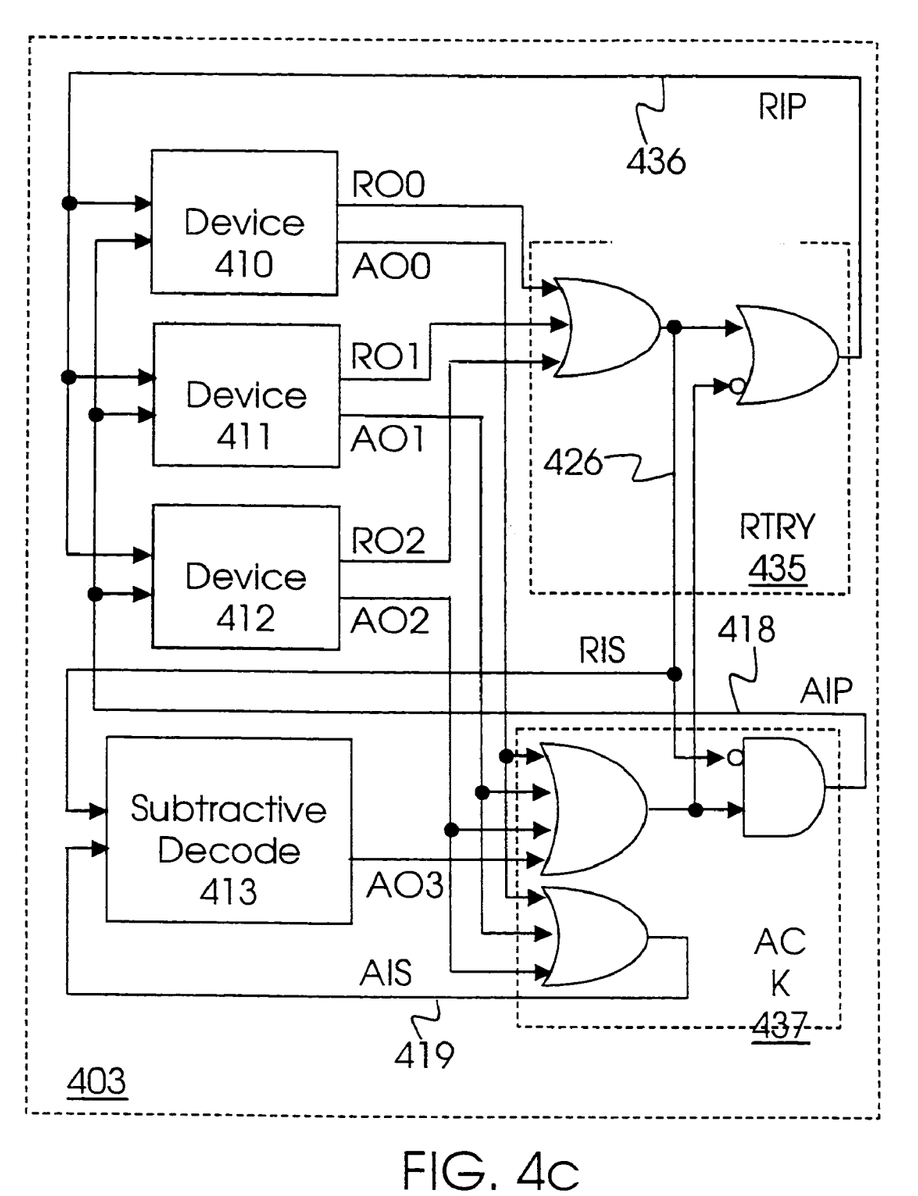
FIG. 4c illustrates details of another alternative embodiment of a data processing system capable of performing fixed latency subtractive decoding.

For example, FIG. 4c illustrates details of another alternative embodiment of a data processing system 403 capable of performing fixed latency subtractive decoding. System 403 comprises devices 410-412, subtractive decoding device 413, acknowledge logic 437, and retry logic 435. Subtractive decoding device 413 speculatively acknowledges bus transactions, transmitting an acknowledge signal AO3 to acknowledge logic 437 within a predetermined time period.

If the bus transaction corresponds to an assigned address range for devices 410, 411 or 412, they may acknowledge, via acknowledge signals AO0, AO1 or AO2. Assertion of any one of acknowledge signals AO0-AO2 causes the generation of an asserted acknowledge signal AIS. Alternatively, devices 410, 411 or 412 may signal to retry the bus transaction, via retry signals RO0, RO1 or RO2, for example, when sufficient recourses are not available to complete the transaction. Assertion of any one of retry signals RO0, RO1 or RO2 causes the generation of an asserted retry signal RIS. Subtractive decoding device 413 disregards the bus transaction if it senses another acknowledgement through acknowledge signal AIS generated by acknowledge logic 437 or retry signal RIS generated by retry logic 435.

For one embodiment of acknowledge logic 437, assertion of any acknowledge signal AO0-AO3 also causes the generation of an asserted acknowledge signal AIP when retry signal RIS is not asserted. For one embodiment of retry logic 435, an asserted retry signal RIP is generated when any of the retry signals RO0-RO2 is asserted or when none of the acknowledge signals AO0-AO3 is asserted. Therefore, an alternative interpretation of the acknowledge signal AIP and the retry signal RIP for one embodiment of a data processing system 403 is shown in Table 2.

TABLE 2

| AIP | RIP | Interpretation |
|---|---|---|
| 1 | 0 | Acknowledgement of the transaction |
| 0 | 1 | Signaling to retry |

Figure 5:
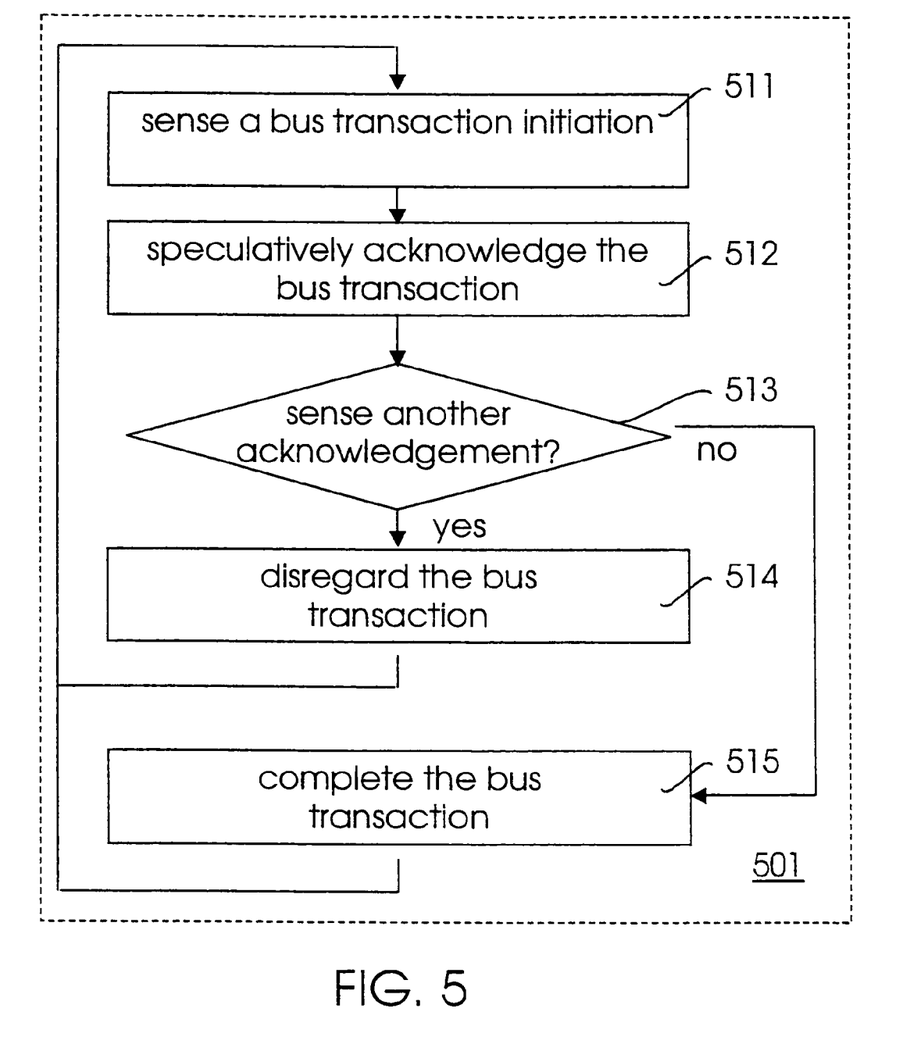
FIG. 5 illustrates a flow diagram for one embodiment of a process to perform fixed latency subtractive decoding.

FIG. 5 illustrates a flow diagram for one embodiment of a process 501 to perform fixed latency subtractive decoding. Process 501 and other processes herein disclosed are performed by processing blocks that may comprise dedicated hardware or software or firmware operation codes executable by general purpose machines or by special purpose machines or by a combination of both.

In processing block 511 the initiation of a bus transaction is sensed. In processing block 512 the bus transaction is speculatively acknowledged. Processing continues in processing block 513 where a determination is made whether another acknowledgement has been sensed. If not, processing proceeds in processing block 515 where the bus transaction is completed by the subtractive decoding device. Otherwise, processing continues in processing block 514 where the bus transaction is discarded by the subtractive decoding device. Processing then returns to processing block 511.

It will be appreciated that a plurality of instantiations of process 501 may be performed by a subtractive decoding device concurrently and/or staggered in a pipelined system capable of pipelined bus transactions.

Figure 6:
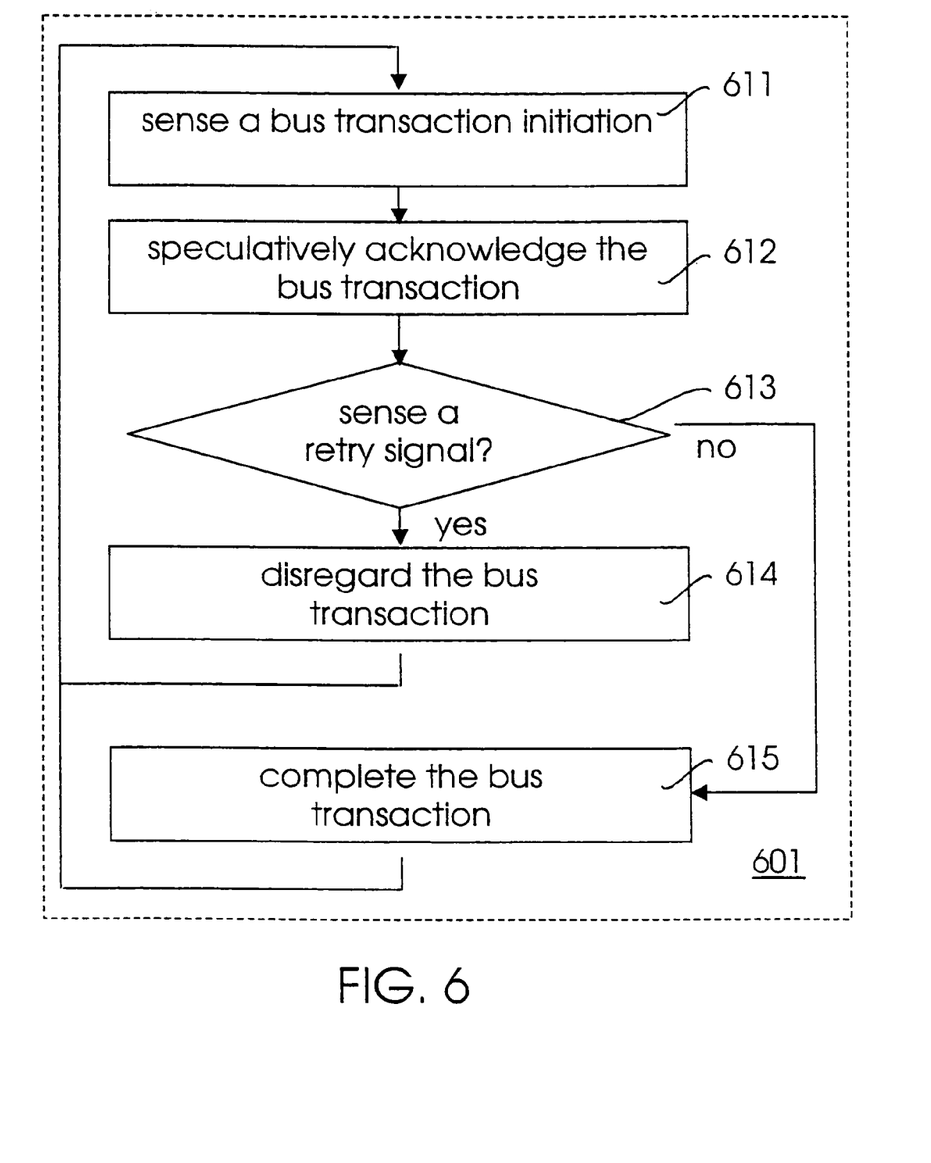
FIG. 6 illustrates a flow diagram for an alternative embodiment of a process to perform fixed latency subtractive decoding.

FIG. 6 illustrates a flow diagram for an alternative embodiment of a process 601 to perform fixed latency subtractive decoding. In processing block 611 the initiation of a bus transaction is sensed. In processing block 612 the bus transaction is speculatively acknowledged. Processing continues in processing block 613 where a determination is made whether a retry signal has been sensed. If not, processing proceeds in processing block 615 where the bus transaction is completed by the subtractive decoding device. Otherwise, processing continues in processing block 614 where the bus transaction is discarded by the subtractive decoding device. Processing then returns to processing block 611.

It will also be appreciated that the above processes are to be regarded in an illustrative rather than restrictive sense and that instantiations of process 501 and of process 601 may be performed concurrently, interleaved and/or staggered in a pipelined system capable of pipelined bus transactions.

Figure 7:
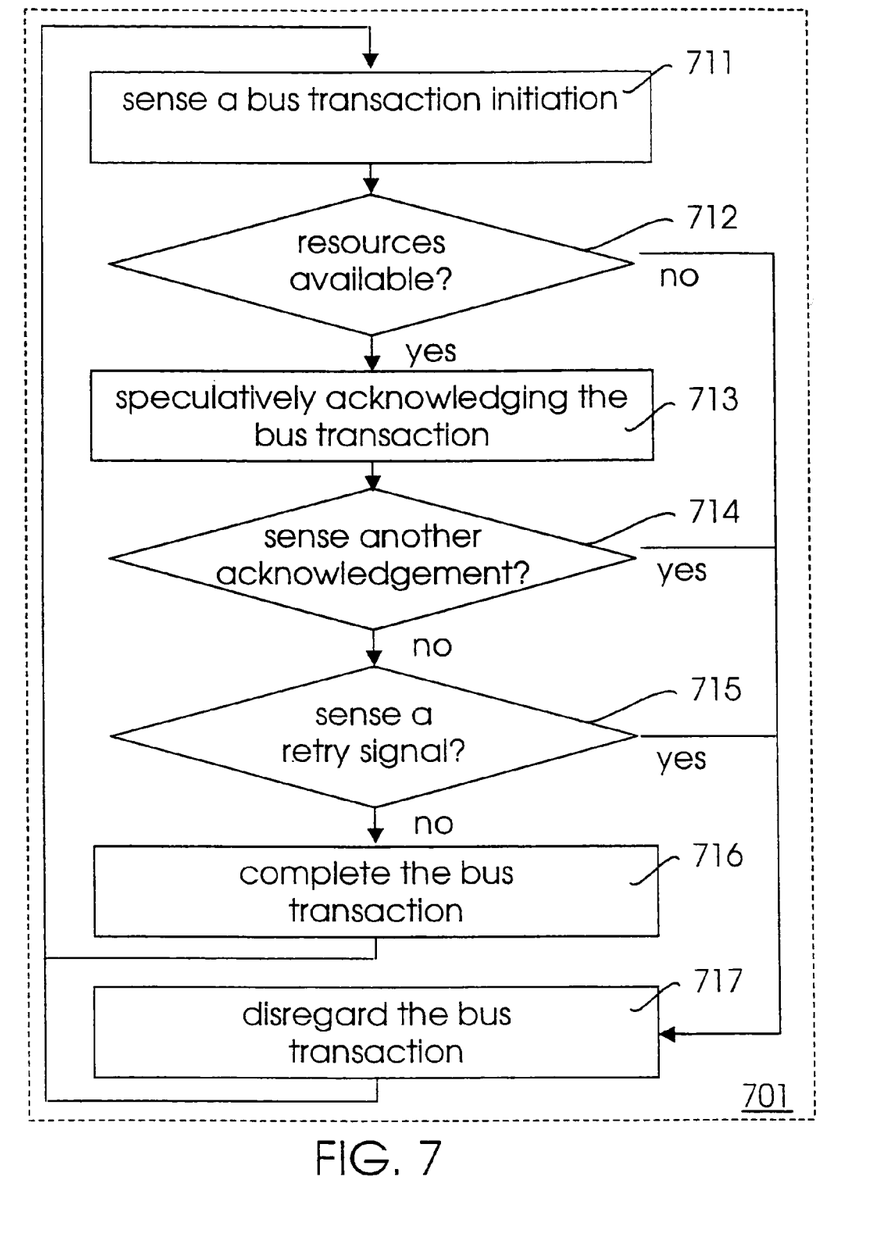
FIG. 7 illustrates a flow diagram for another alternative embodiment of a process to perform fixed latency subtractive decoding.

FIG. 7 illustrates a flow diagram for another alternative embodiment of a process 701 to perform fixed latency subtractive decoding. In processing block 711 the initiation of a bus transaction is sensed. Processing continues in processing block 712 where a determination is made whether sufficient resources are available to complete the transaction. If not, processing proceeds in processing block 717 where the bus transaction is disregarded by the subtractive decoding device and processing returns to processing block 711. Otherwise, processing continues in processing block 713 where the bus transaction is speculatively acknowledged. Processing continues in processing block 714 where a determination is made whether another acknowledgement signal has been sensed. If so, processing proceeds in processing block 717 where the bus transaction is disregarded by the subtractive decoding device and processing returns to processing block 711. Otherwise, processing continues in processing block 715 where a determination is made whether a retry signal has been sensed. If so, processing proceeds in processing block 717 where the bus transaction is disregarded by the subtractive decoding device and processing returns to processing block 711. Otherwise, processing continues in processing block 716 where the bus transaction is completed by the subtractive decoding device. Processing then returns to processing block 711.

Figure 8:
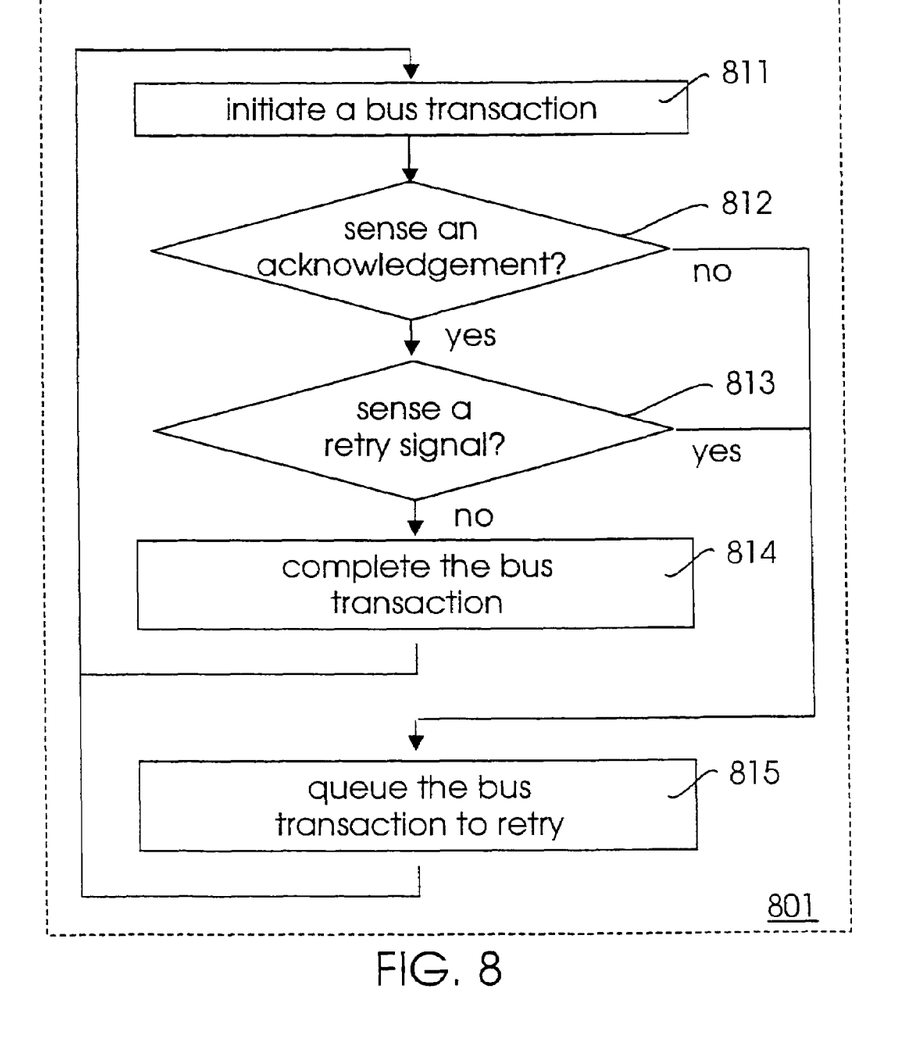
FIG. 8 illustrates a flow diagram for one embodiment of a process to perform bus transactions in a system with fixed latency subtractive decoding.

FIG. 8 illustrates a flow diagram for one embodiment of a process 801 to perform bus transactions in a system with fixed latency subtractive decoding. In processing block 811 a bus transaction is initiated. Processing continues in processing block 812 where a determination is made whether an acknowledgement signal has been sensed. If not, processing proceeds in processing block 815 where the bus transaction is queued to retry and processing returns to processing block 811. Otherwise, processing continues in processing block 813 where a determination is made whether a retry signal has been sensed. If so, processing proceeds in processing block 815 where the bus transaction is queued to retry and processing returns to processing block 811. Otherwise, processing continues in processing block 814 where the bus transaction is completed. Processing then returns to processing block 811.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. An apparatus comprising:
    a positive decoding device configured to acknowledge a first bus transaction within a first time period based on a signal received from a bus; and
    a subtractive decoding device configured to acknowledge a second bus transaction within a second time period substantially equal to the first time period based on a signal received from the bus.

2. The apparatus of claim 1 wherein the subtractive decoding device conditionally acknowledges the first bus transaction within the first time period.

3. An apparatus comprising:
acknowledge logic configured to assert a first acknowledge signal in response to a signal received from a bus interface indicating the initiation of a first bus transaction; and
subtractive decoding logic configured to sense a second acknowledge signal and to disregard the signal received from the bus interface indicating the initiation of a first bus transaction in response to the second acknowledge signal.

4. The apparatus of claim 3 wherein the acknowledge logic withholds the second acknowledge signal in response to receiving a signal from the bus interface indicating the initiation of a second bus transaction only when resources are insufficient to satisfy the second bus transaction.

5. An apparatus comprising:
acknowledge logic configured to transmit a first acknowledge signal in response to a signal received from a bus interface indicating the initiation of a first bus transaction; and
subtractive decoding logic to detect a retry signal and to disregard the signal received from a bus interface indicating the initiation of a first bus transaction in response to detection of the retry signal.

6. The apparatus of claim 5 wherein the acknowledge logic withholds a second acknowledge signal in response to receiving a signal from the bus interface indicating the initiation of a second bus transaction.

7. A computing system comprising:
a bus agent to initiate a first bus transaction;
a positive decoding device to acknowledge the first bus transaction within a first time period beginning from initiation of the first bus transaction; and
a subtractive decoding device to conditionally acknowledge the first bus transaction within the first time period.

8. The computing system of claim 7, wherein the subtractive decoding device disregards the first bus transaction if the first bus transaction has been acknowledged by the positive decoding device.

9. A computing system comprising:
a bus agent to initiate a plurality of bus transactions;
a positive decoding device to acknowledge a first bus transaction of the plurality of bus transactions within a predetermined time period from initiation of the first bus transaction; and
a subtractive decoding device to acknowledge a second bus transaction of the plurality of bus transactions within substantially the same predetermined time period.

10. The computing system of claim 9, wherein the subtractive decoding device disregards the second bus transaction in response to (a) the positive decoding device acknowledging the second bus transaction or (b) signaling to retry the second bus transaction.

11. An apparatus comprising:
a bus interface to sense initiation of a bus transaction; and
a decoding device having a machine-accessible medium including data that, when executed by the decoding device, causes the decoding device to:
conditionally assert a first acknowledge signal to acknowledge a bus transaction; and
disregard the bus transaction if a second acknowledge signal is asserted.

12. The apparatus of claim 11, the machine-accessible medium including data that causes the decoding device to:
disregard the bus transaction if a retry signal is asserted.

13. An apparatus comprising:
a bus interface to sense a first bus transaction; and
a subtractive decoding device to conditionally acknowledge the first bus transaction with a first acknowledgement within a predetermined time period;
wherein the bus interface also senses a second acknowledgement of the first bus transaction within the predetermined time period, and the subtractive decoding device disregards the first bus transaction in response to the second acknowledgement.

14. The apparatus of claim 13 further comprising:
a bus master to initiate a second bus transaction; wherein
the bus interface senses the second bus transaction,
the subtractive decoding device withholds acknowledgement of the second bus transaction within the predetermined time period, and
the bus master retries the second bus transaction in response to the withholding of acknowledgement of the second bus transaction.

15. The apparatus of claim 14 wherein the second acknowledgement of the first bus transaction is provided by a positive decoding device.

16. The apparatus of claim 14, the subtractive decoding device to withhold acknowledgement of the second bus transaction instead of signaling to retry the second bus transaction.

17. An apparatus comprising:
a bus interface to sense initiation of a first bus transaction; and
a subtractive decoding device to conditionally acknowledge the first bus transaction within a first predetermined time period from the first bus transaction initiation; wherein
the bus interface also senses a retry signal for the first bus transaction; and
the subtractive decoding device disregards the first bus transaction in response to sensing of the retry signal.

18. The apparatus of claim 17 wherein the retry signal for the first bus transaction is provided by a positive decoding device.

19. The apparatus of claim 17 further comprising:
a bus master to initiate a second bus transaction; wherein
the bus interface senses the second bus transaction
the subtractive decoding device withholds acknowledgement of the second bus transaction within a second predetermined time period from initiation of the second bus transaction, and
the bus master retries the second bus transaction in response to the withholding acknowledgement of the second bus transaction.

20. The apparatus of claim 19, the subtractive decoding device to withhold acknowledgement of the second bus transaction instead of signaling to retry the second bus transaction.

* * * * *